June 10, 1969   A. M. NAMIROWSKI   3,448,698
SALT-SEPARATING UNIT FOR BAKING APPARATUS
Filed Sept. 19, 1967
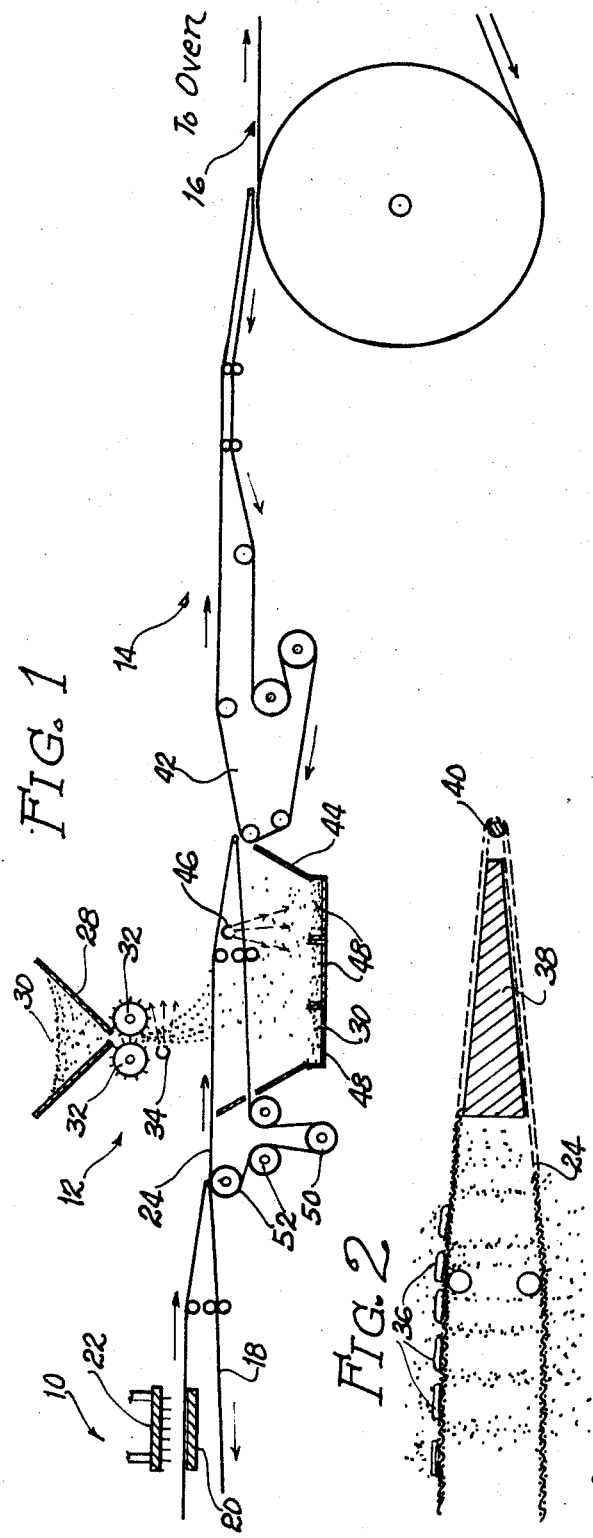
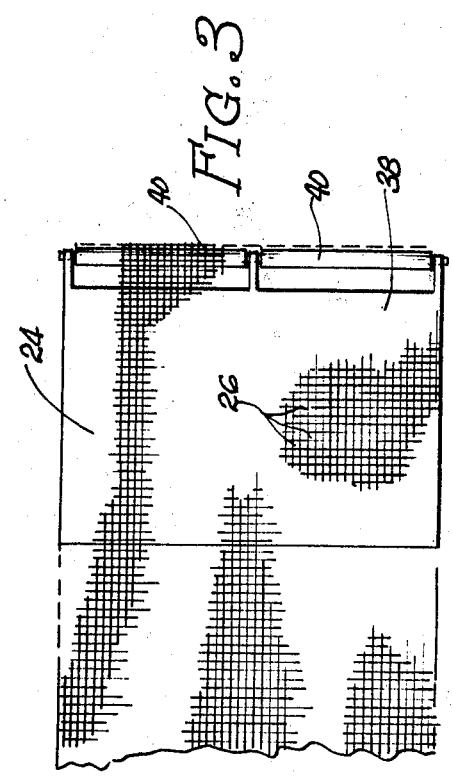
INVENTOR.
Adam M. Namirowski
by McDougall Hersh Scott
and Ladd
Attys

United States Patent Office 3,448,698
Patented June 10, 1969

3,448,698
SALT-SEPARATING UNIT FOR
BAKING APPARATUS
Adam M. Namirowski, 3123 W. 42nd St.,
Chicago, Ill. 60632
Filed Sept. 19, 1967, Ser. No. 668,906
Int. Cl. A21c 9/04; A23g 3/20
U.S. Cl. 107—43                          5 Claims

ABSTRACT OF THE DISCLOSURE

A unit including a conveyor mechanism for supporting food products prior to introduction of the products into a baking oven. The conveyor comprises a wire mesh belt and mechanisms for depositing salt on a food product carried by the belt are located above the upper flight of the belt. Openings are provided in the belt which are large enough to permit passage of salt therethrough and which are large enough to adequately support the food products. With this arrangement, excess salt will pass through the belt into a collecting hopper and will not be transported into the oven.

---

This invention relates to construction utilized for the handling and baking of food products. The invention is particularly concerned with conveyor means employed for transporting the food products to a baking oven and also employed for supporting the food products while comminuted material such as salt is deposited on the food products.

The invention will be particularly described with reference to the baking of crackers. In accordance with present techniques, the crackers are provided in a raw state on a conveyor belt and then moved to a stamping station. At this point, the crackers are divided into relatively small units whereby the belt must be capable of supporting the individual crackers so that their shape will be maintained. A solid cotton belt is usually used for this purpose.

The conveyor belt in conventional system then moves to a salting station where the particles of salt are distributed over the crackers. The salt is usually stored in a hopper located above the belt, and distributing means, which may include an air stream for breaking up the salt coming from the hopper, spread the salt over the crackers. Obviously, some of the salt will fall directly onto the belt inbetween the individual crackers.

The conveyor then passes the crackers onto additional conveyors for purposes of moving the crackers through an oven. The transfer of the crackers from one conveyor to another also results in the transfer of the excess salt. Accordingly, substantial amounts of excess salt are moved toward the oven.

Attempts have been made to prevent the salt from entering the oven, for example by providing a split apron at the entrance of the oven. The split apron essentially comprises a pair of conveyor belts which are spaced apart by a small distance for the purpose of permitting the excess salt to fall through the spacing while providing for transfer of the crackers from one belt to another. Since the crackers are in a doughy state, only a very small opening is possible and, therefore, substantial amounts of salt pass with the crackers onto the conveyor belt and through the oven.

When the salt passes into the oven, a great many problems result. The baking ovens usually include gas burners, and the salt will fall on and into the burners causing malfunctions. Furthermore, the salt has been found to penetrate the bearings of idler rollers used in the ovens resulting in frozen rollers. The malfunction of the burners will result in improper baking of the crackers while the penetration of bearings adds to maintenance problems. Additional maintenance problems are created simply due to the accumulation of salt in the ovens since such salt must be periodically cleaned out.

It is a general object of this invention to provide improved mechanisms for incorporation in constructions employed for the baking of crackers and the like whereby problems resulting from the passage of excess salt into the ovens can be eliminated.

It is a more particular object of this invention to provide mechanisms consisting of a salt depositing station which includes a conveyor belt and salt collecting means specifically designed for the removal of excess salt whereby the salt will not be transferred into the baking oven.

These and other objects of this invention will appear hereinafter and for purposes of illustration but not of limitation, a specific embodiment of the invention is shown in the accompanying drawing in which:

FIGURE 1 is a schematic illustration of conveyor means used for transporting crackers to be delivered to a baking oven;

FIGURE 2 is an enlarged fragmentary view of the conveyor means employed at a salt depositing station; and, FIGURE 3 is a plan view of the conveyor means shown in FIGURE 2.

The construction of this invention generally comprises an apparatus including a first conveyor designed for supporting food products which are to be ultimately transported to a baking oven. A unit for depositing comminuted material such as salt is located beyond this first conveyor. The unit includes a separate conveyor belt which defines a plurality of spaced apart openings. The belt, which may be wire mesh, picks up the food products from the first conveyor and moves them beneath a hopper employed for distributing salt onto the food products. Any excess amounts of salt are passed through the openings in the conveyor and are collected by means disposed beneath the conveyor. The passage of excess salt to the baking oven is thereby eliminated.

FIGURE 1 illustrates a system incorporating a salt depositing station of the type described. The system includes a cutting station 10 which precedes the salt depositing unit 12, and a conveyor arrangement 14 for passing food products to oven conveyor 16.

The station 10 includes a continuous belt 18, preferably formed of solid cotton. A sheet of dough is deposited on the belt at a point not shown, and the belt then moves the sheet of dough over a plate 20. A cutting die 22 moves downwardly into contact with the dough for purposes of forming individual crackers or the like. The individual crackers are then moved toward the unit 12 for transfer to conveyor 24.

The conveyor 24 comprises an endless belt having a plurality of individual openings 26 formed therein. The belt can be conveniently manufactured from wire mesh. The crackers on the belt are moved beneath the hopper 28 which contains a supply of salt 30. Distributing wheels 32 may be provided for breaking up salt passing from the hopper, and an air pipe 34 may also be employed for further breaking up of the salt so that it will fall in a shower onto the surface of the crackers located on the belt 24. Obviously, the invention contemplates any conventional means for passing the salt from the hopper 28 to the surface of the belt 24.

As best shown in FIGURE 2, the crackers 36 pick up salt; however, any excess amounts of salt are passed onto the conveyor surface for ultimate passage through the conveyor. Accordingly, salt is not passed beyond the depositing station.

FIGURE 2 also illustrates a typical transfer roll for supporting the belt 24. The roll includes a plate 38 which is secured at either end to provide a firm support for the belt. Small idlers 40 are located at the extreme end of the plate 38 so that the end of the conveyor is relatively narrow. This greatly facilitates passage of the crackers from the belt 24 onto the belt 42 which acts as the means for transferring the crackers to the oven conveyor 16.

When the salt falls through the belt 24, it is passed into a collecting bin 44. It will be noted in this connection that the salt will pass through both the upper and lower flights of the conveyor 24 whereby none of the salt will be carried to the conveyor 42. In the event that some salt tends to cling to the conveyor belt, a blower such as shown at 46 can be provided for directing an air stream onto the belt for purposes of dislodging any excess salt.

At the bottom of the bin, there are provided a plurality of pans 48 which actually receive the salt collected in the bins. These pans are preferably removable so that the salt can be recycled.

It will be noted that the combination of the conveyor 24 and bin 44 comprises a relatively small unit. It is contemplated that supporting means, independent of the other supporting structure of the system, could be provided for this unit, and these supporting means could include wheels or other means which will lend portability to the system. In the event of malfunction or mechanical failure, or when cleaning of the unit is required, the unit could be quickly removed and replaced by a corresponding unit without any need for a significant delay in the baking operation. This provides another distinct advantage over prior constructions wherein the belt passing by the cutting station also was employed for transporting the crackers past the salting station. The unit includes a main drive sprocket 50 and idler sprockets 52 for the belt 24. An independent, variable speed motor is provided for the unit so that the speed of the conveyor can be synchronized with the speed of the conveyors 18 and 42.

After the crackers have been salted, they are readily transferred to the conveyor belt 42 with no excess salt carried along. The belt 42 then provides for passage of the crackers to the over conveyor.

As indicated, the elimination of salt from the conveyor belt which carries the crackers through the oven is of extreme importance. Consistency in baking cannot be achieved where salt builds up on gas burners and, accordingly, the instant invention provides a distinct means for improving the quality of baked goods.

The maintenance savings are also of extreme importance. Cleaning of the burners and bearings can be greatly minimized as well as cleaning of the oven in general. Since baking ovens for crackers are usually several hundred feet long, any reduction in the need for cleaning represents a considerable savings.

The instant invention also provides for the saving of salt in that excess salt can be recycled. It will be appreciated, however, that the salt is relatively inexpensive and, therefore, this saving is not as important as the advantages referred to above.

In selecting a suitable wire mesh belt, attention must be given to the size of the openings in the belt. The crackers are in the form of individual pieces of raw dough when they are carried by the belt and, therefore, the openings must be small enough to prevent loss of shape in the crackers. On the other hand, the openings must be large enough to allow the passage of salt. Stainless steel chain link conveyor belting and flat surface flexible belting having openings in the range of $1/16$ to $3/4$ inch have been found to be suitable.

It will be understood that various changes and modifications may be made in the above described construction which provide the characteristics of this invention without departing from the spirit thereof particularly as defined in the following claims.

That which is claimed is:

1. In an apparatus for the baking of crackers wherein the crackers are disposed in a doughy state as separate pieces on a conveyor and are thereafter transported to a baking oven, and wherein a station is provided for depositing salt on the doughy pieces prior to the movement of the pieces into the oven, the improvement comprising a conveyor belt located at said station, said conveyor belt defining a plurality of spaced-apart openings having a maximum dimension whereby adequate support will be provided for the pieces and a minimum dimension which will permit passage of salt through the belt, said belt supporting said pieces as salt is deposited thereon and being completely independent of the conveying means for transporting the pieces to and from said station, whereby virtually all of the material which is not deposited on said pieces falls through the belt and is, therefore, not transported to said oven, and including a collecting means for said material located beneath both the upper and lower flights of said conveyor belt whereby said material passes through both flights before being collected by said collecting means.

2. An apparatus in accordance with claim 1 wherein said conveyor belt comprises a wire mesh belt.

3. An apparatus in accordance with claim 1 wherein said collecting means includes pans for receiving salt passed through the belt, said pans being removable from said collecting means whereby salt collected in the pans can be recycled.

4. An apparatus in accordance with claim 1 including a blower positioned adjacent the path of movement of said belt, said blower operating to dislodge particles of salt disposed on said belt.

5. An apparatus in accordance with claim 1 wherein said collecting means is portable whereby the collecting means can be readily replaced without disrupting the operation of the apparatus.

References Cited

UNITED STATES PATENTS

| | | | |
|---|---|---|---|
| 874,570 | 12/1907 | Cairncross | 118—24 |
| 1,143,133 | 6/1915 | Perry | 15—347 XR |
| 2,929,311 | 3/1960 | Heltzel | 99—446 XR |
| 3,045,640 | 7/1962 | Hill et al. | 118—24 XR |
| 3,272,154 | 9/1966 | Kratz | 107—43 XR |

WILLIAM I. PRICE, *Primary Examiner.*

ARTHUR O. HENDERSON, *Assistant Examiner.*